(12) United States Patent
Chaudhry et al.

(10) Patent No.: US 7,469,334 B1
(45) Date of Patent: Dec. 23, 2008

(54) METHOD AND APPARATUS FOR FACILITATING A FAST RESTART AFTER SPECULATIVE EXECUTION

(75) Inventors: Shailender Chaudhry, San Francisco, CA (US); Marc Tremblay, Menlo Park, CA (US); Quinn A. Jacobson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 181 days.

(21) Appl. No.: 11/095,643

(22) Filed: Mar. 30, 2005
(Under 37 CFR 1.47)

Related U.S. Application Data

(60) Provisional application No. 60/558,016, filed on Mar. 30, 2004.

(51) Int. Cl.
*G06F 9/44* (2006.01)
(52) U.S. Cl. ................................... 712/228
(58) Field of Classification Search ............... 712/207, 712/244, 228
See application file for complete search history.

(56) References Cited

U.S. PATENT DOCUMENTS 5,317,701 A * 5/1994 Reininger et al. ........... 712/207
5,881,280 A * 3/1999 Gupta et al. ................ 712/244
6,785,803 B1 * 8/2004 Merchant et al. ........... 712/219
6,944,718 B2 * 9/2005 Jouppi et al. ............... 711/137

OTHER PUBLICATIONS

R. Barnes, E. Nystrom, J. Sias, S. Patel, N. Navarro, W. Hwu, Beating in-order stalls with "flea-flicker" two-pass pipelining, Dec. 2003, Proceedings of the 36th IEEE/ACM International Symposium on Micro-Architecture.*
Onur Mutlu, Jared Stark, Chris Wilkerson, Yale N. Patt, "Runahead Execution: An Alternative to Very Large Instruction Windows for Out-of-Order Processors," hpca, p. 129, The Ninth International Symposium on High-Performance Computer Architecture (HPCA'03), 2003.*

(Continued)

*Primary Examiner*—Eddie P Chan
*Assistant Examiner*—Jacob Petranek
(74) *Attorney, Agent, or Firm*—Park, Vaughan & Fleming LLP

(57) ABSTRACT

One embodiment of the present invention provides a system that facilitates a fast execution restart following speculative execution. During normal operation of the system, a processor executes code on a non-speculative mode. Upon encountering a stall condition, the system checkpoints the state of the processor and executes the code in a speculative mode from the point of the stall. As the processor commences execution in speculative mode, it stores copies of instructions as they are issued into a recovery queue. When the stall condition is ultimately resolved, execution in non-speculative mode is recommenced and the execution units are initially loaded with instructions from the recovery queue, thereby avoiding the delay involved in waiting for instructions to propagate through the fetch and the decode stages of the pipeline. At the same time, the processor begins fetching subsequent instructions following the last instruction in the recovery queue. When all the instructions have been loaded from the recovery queue, the execution units begin receiving the subsequent instructions that have propagated through the fetch and decode stages of the pipeline.

20 Claims, 2 Drawing Sheets

OTHER PUBLICATIONS

Alvin R. Lebeck, Tong Li, Eric Rotenberg, Jinson Koppanalil, Jaidev Patwardhan, "A Large, Fast Instruction Window for Tolerating Cache Misses," isca, p. 0059, 29th Annual International Symposium on Computer Architecture (ISCA'02), 2002.*

James Dundas and Trevor Mudge, "Improving Data Cache Performance by Pre-Executing Instructions Under a Cache Miss," 11th ACM International Conference on Supercomputing, Jul. 1997.*

* cited by examiner

METHOD AND APPARATUS FOR FACILITATING A FAST RESTART AFTER SPECULATIVE EXECUTION

RELATED APPLICATION

This application hereby claims priority under 35 U.S.C. §119 to U.S. Provisional Patent Application No. 60/558,016, filed on 30 Mar. 2004, entitled "Method and apparatus for facilitating a fast restart after speculative execution," by inventors Marc Tremblay, Shailender Chaudhry, and Quinn A. Jacobson. The subject matter of this application is also related to the subject matter of commonly-assigned U.S. patent application Ser. No. 10/741,944 filed 19 Dec. 2003, entitled "Generating Prefetches by Speculatively Executing Code through Hardware Scout Threading," by inventors Shailender Chaudhry and Marc Tremblay.

BACKGROUND

1. Field of the Invention

The present invention relates to the design of processors within computer systems. More specifically, the present invention relates to a method and an apparatus for buffering instructions from a processor pipeline during speculative execution in order to facilitate a fast restart after speculative execution without a pipeline filling delay.

2. Related Art

Recent increases in microprocessor clock speeds have not been matched by corresponding increases in memory access speeds. Hence, the disparity between microprocessor clock speeds and memory access speeds continues to grow. Execution profiles for fast microprocessor systems show that a large fraction of execution time is spent, not within the microprocessor core, but within memory structures outside of the microprocessor core. This means that microprocessors spend a large fraction of time stalled waiting for memory references to complete instead of performing computational operations.

As more processor cycles are required to perform a memory access, even processors that support "out-of order execution" are unable to effectively hide memory latency. Consequently, a processor will frequently stall waiting until requested data is returned from memory. Instead of waiting for stall condition to be resolved, it is possible to checkpoint the state of the processor and then speculatively execute instructions past the stall point in an attempt to prefetch subsequent loads (see related U.S. patent application Ser. No. 10/741,944 listed above). This technique can dramatically improve performance if the speculative execution is successful in prefetching subsequent loads.

However, this type of speculative execution can cause performance problems because the contents of the pipeline are overwritten during speculative execution. Consequently, when the stall condition is eventually resolved, and normal non-speculative execution recommences, the processor will first have to refill the pipeline again by fetching and decoding instructions immediately following stall point. Since pipeline stages are getting deeper as clock frequencies continue to increase, the effective latency associated with the fetch and decode stages is becoming longer. Because of this increased latency, execution units are forced to sit idle for more clock cycles following speculative execution. This wastes valuable cycles, and can thereby adversely affect processor performance. Hence, what is needed is a method and apparatus that allows the execution unit of the processor to do useful work while the initial instructions are fetched and decoded following after a restart after speculative execution.

SUMMARY

One embodiment of the present invention provides a system that facilitates a fast execution restart following speculative execution. During normal operation of the system, a processor executes code in a non-speculative mode. Upon encountering a stall condition, the system checkpoints the state of the processor and executes the code in a speculative mode from the point of the stall. As the processor commences execution in speculative mode, it stores copies of instructions as they are issued into a recovery queue. When the stall condition is ultimately resolved, execution in non-speculative mode is recommenced and the execution units are initially loaded with instructions from the recovery queue, thereby avoiding the delay involved in waiting for instructions to propagate through the fetch and the decode stages of the pipeline. At the same time, the processor begins fetching subsequent instructions following the last instruction in the recovery queue. When all the instructions have been loaded from the recovery queue, the execution units begin receiving the subsequent instructions that have propagated through the fetch and decode stages of the pipeline.

In a variation of this embodiment, the instructions that are stored in the recovery queue during the speculative mode have passed through fetch and decode stages of a pipeline and are fully decoded.

In a further variation, the system maintains a last instruction pointer to the physical address of the instruction following the last instruction stored in the recovery queue. After the stall condition is resolved, the non-speculative mode commences fetching instructions using this last instruction pointer.

In a further variation, during speculative mode, instructions are stored in the recovery queue until the recovery queue is full, at which point the instructions are no longer stored in the recovery queue.

In a further variation, the recovery queue is full when it contains enough instructions to hide the latency of the fetch and decode stages when the non-speculative mode is recommenced after a stall condition is resolved.

In a further variation, the recovery queue is implemented as a FIFO structure.

In a further variation, the FIFO structure is implemented using a RAM structure.

In a further variation, the recovery queue includes a pointer indicating where the speculative mode will store the next instruction in the recovery queue and a pointer indicating where the non-speculative mode should read the next instruction from the recovery queue.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
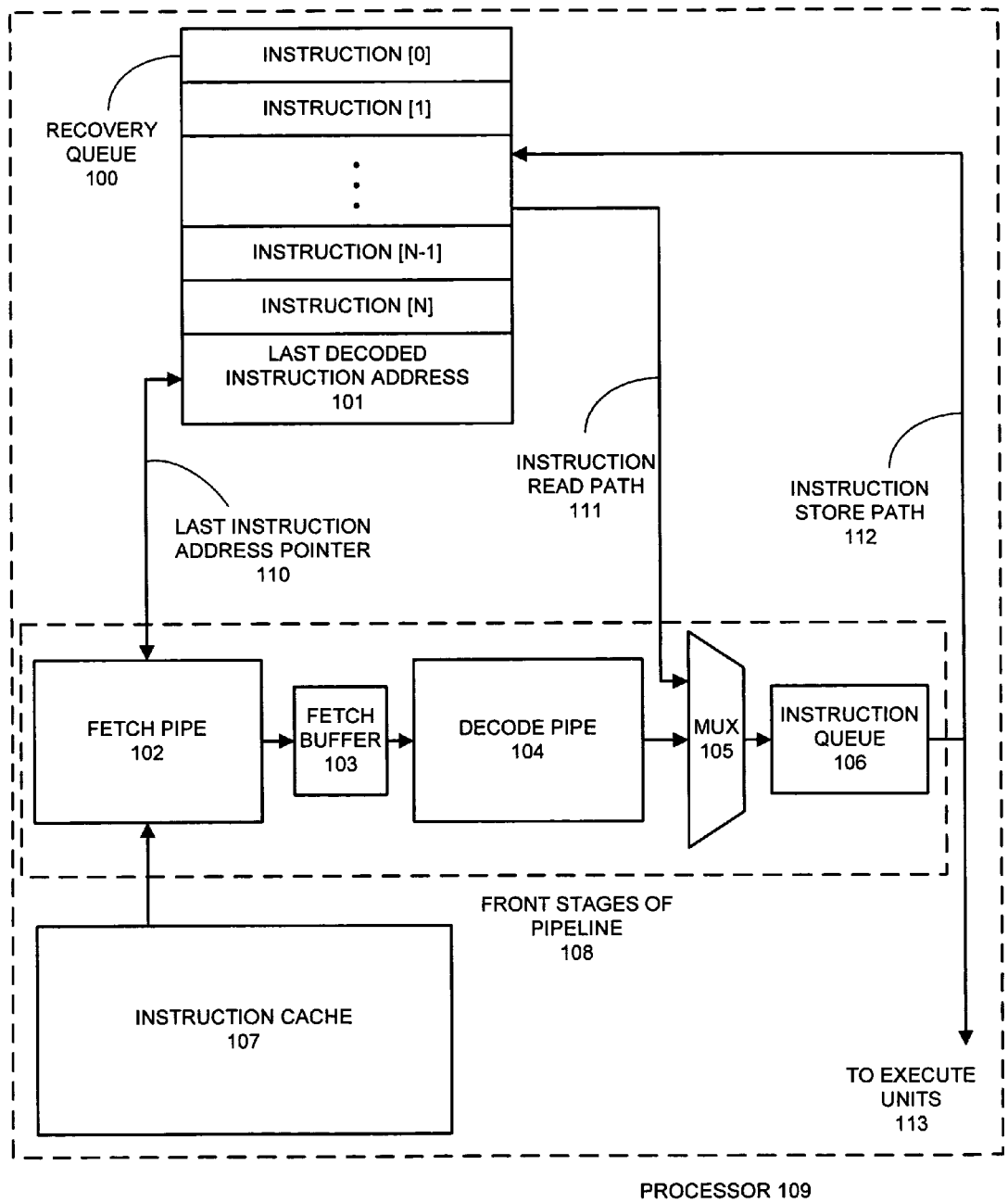
FIG. 1 illustrates a processor within a computer system in accordance with an embodiment of the present invention.

FIG. 1 illustrates processor 109 within a computer system in accordance with an embodiment of the present invention. This computer system can generally include any type of computer system, including, but not limited to, a computer system based on a microprocessor, a mainframe computer, a digital signal processor, a portable computing device, a personal organizer, a device controller, and a computational engine within an appliance.

Recovery queue 100 can be implemented as a FIFO structure that can accommodate a number of decoded instructions. Recovery queue 100 additionally contains last decoded instruction address 101. Last decoded instruction address 101 contains the physical address of the instruction following the last decoded instruction in recovery queue 100. Fetch pipe 102 includes last instruction address pointer 110, which indicates the location of last decoded instruction address 101.

Processor 109 additionally contains a number of hardware structures that do not exist in a typical microprocessor. In particular, processor 109 includes multiplexer (MUX) 105 and recovery queue 100. MUX 105 allows the processor to selectively control the source for instructions being loaded into instruction queue 106, which feeds into execution units 113. During a fast restart, MUX 105 channels decoded instructions from recovery queue 100 into instruction queue 106. Otherwise, outside of a fast restart, MUX 105 channels decoded instructions from decode pipe 104 into instruction queue 106.

Processor 109 contains a number of hardware structures found in a typical microprocessor. More specifically, processor 109 includes front stages of pipeline 108, which include fetch pipe 102, fetch buffer 103, decode pipe 104, and instruction queue 106. It also includes instruction cache 107 which stores instructions retrieved from system memory.

At the commencement of speculative execution, the processor stores instructions to recovery queue 100 through instruction store path 112. Note that these instructions have already passed through fetch stages 102 and decode stages 104 of the pipeline and are therefore decoded and ready for consumption by execute units 113. After recovery queue 100 is full, the processor stops loading additional instructions into recovery queue 100.

After the stall condition is resolved and non-speculative execution recommences, the execution units initially receive decoded instructions from recovery queue 100 through instruction read path 111. These decoded instructions feed through MUX 105 and into instruction queue 106. From instruction queue 106 the decoded instructions feed directly into execute units 113. At the same time, the system uses the last decoded instruction address 101 to being fetching instructions past the last instruction contained in recovery queue 100.

The execution units 113 continue to receive decoded instruction from recovery queue 100 until recover queue 100 is empty. Once recovery queue 100 is empty, execution units receive subsequent instructions following the last instruction contained in recovery queue 100 that have been fetched and decoded after non-speculative recommenced.

In one embodiment of this invention, recovery queue 100 contains enough instructions to hide the latency of the front stages of the pipeline 108.

In one embodiment of this invention, recovery queue 100 is implemented as a RAM structure.

Fast Restart Process

Figure 2:
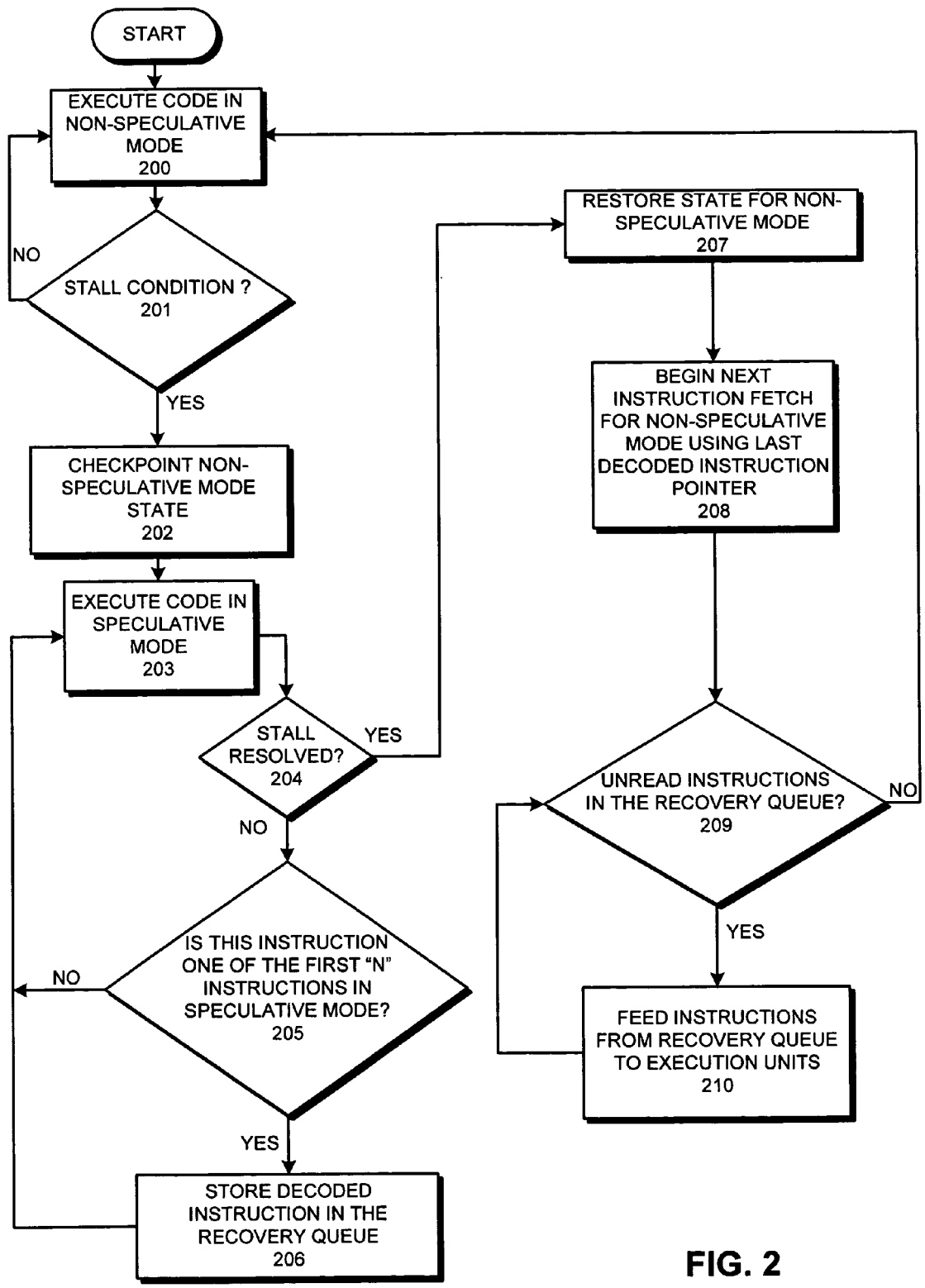
FIG. 2 presents a flow chart illustrating the process for fast restart using a recovery queue in accordance with an embodiment of the present invention.

FIG. 2 presents a flow chart illustrating the fast restart process in accordance with an embodiment of the present invention.

The system starts in execution of code on a processor (step 200). For purposes of this description of this description, execution of the code takes place in either non-speculative mode or speculative mode. During non-speculative mode, results of the execution are committed to the architectural state of the processor. In contrast, during speculative mode results are not committed to the architectural state of the processor.

While executing in non-speculative mode, the processor encounters a stall conditions (step 201), such as cache miss that causes a load. This stall condition causes non-speculative execution to halt, while the required instruction is loaded from system memory.

Instead of simply waiting for the stall condition to be resolved, the processor checkpoints the state of the non-speculative mode (step 202), and continues to execute code from the point of the stall in speculative mode (step 203). During the commencement of the speculative mode, decoded instructions are initially copied into the recovery queue (step 206) until the recovery queue is full. Once the recovery queue is full, the speculative mode continues executing without storing decoded instructions into the recovery queue (step 205).

When the stall condition is eventually resolved (step 204), the system restores the checkpointed state of the non-speculative mode (step 207) and recommences execution in non-speculative mode from the point of the stall.

Although the non-speculative mode will recommence execution from the point of the stall, it does not have to wait for instructions to be fetched and decoded. Instead, the execution units will receive fully decoded instructions from the recovery queue while the processor begins fetching and decoding instructions following the last instruction in the recovery queue.

When non-speculative execution recommences, the system uses a pointer that points to the instruction following the last instruction in the recovery queue to begin fetching its instructions for the first stages of its pipeline (step 208). The execution units continue to receive instructions from the recovery queue (step 210) until there are none left (step 209).

By the time all the instructions in the recovery queue are used up, the fetch and decode stages of the pipeline will be full, and there will be an instruction waiting to be fed into the execution units from the fetch and decode stages. This instruction is the first instruction that has been fetched and decoded during non-speculative mode. The pipeline then continues to fetch and decode subsequent instructions (step 200).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art.

Note that the speculative execution described in this application can generally refer to any type of speculative execution where contents of the pipeline are overwritten by execution of speculative instructions. For example, the speculative execution can involve "scout threading" as is described in U.S. patent application Ser. No. 10/741,944 filed 19 Dec. 2003, which is hereby incorporated by reference to describe details of this type of speculative execution. The speculative execution can also involve the speculative execution that takes place when branches are predicted. Note that for some types of speculative execution, such as branch prediction, it may not be necessary to explicitly checkpoint the state of the processor. In these types of systems, as long as results of the speculative execution are not committed to the architectural state of the processor, it is possible to back up execution to the point where the speculative execution commenced.

Additionally, the above disclosure is not intended to limit the present invention. The scope of the present invention is defined by the appended claims.

What is claimed is:

1. A method for facilitating a fast restart of a processor after speculative execution, comprising:
   executing code in a non-speculative mode in a pipeline in the processor; and
   upon encountering a stall condition,
      checkpointing a state of the processor, and
      executing the code in a speculative mode from a point of the stall in the pipeline, wherein, along with speculatively executing a predetermined number of the instructions initially encountered during execution in the speculative mode, storing all of the predetermined number of instructions, which are ready to be executed, regardless of the dependencies of the instructions, into a recovery queue;
   when the stall condition is resolved, recommencing execution in non-speculative mode in the pipeline, wherein recommencing execution initially involves using instructions from the recovery queue to load an execution unit, thereby not having to wait for instructions to propagate through fetch and decode pipeline stages; and
   subsequently executing instructions that follow instructions from the recovery queue in the pipeline, wherein the subsequently executed instructions propagated through the fetch and decode stages of the pipeline after non-speculative execution recommenced.

2. The method of claim 1, wherein instructions buffered in the recovery queue are fully decoded instructions which have passed through fetch and decode pipeline stages.

3. The method of claim 2, wherein the recovery queue supplies fully decoded instructions to the execution unit after non-speculative execution recommences until the execution unit is able to receive instructions that have propagated through the fetch and decode stages of the pipeline.

4. The method of claim 2, wherein the recovery queue maintains a pointer to a physical address of an instruction following a last instruction stored in the recovery queue, thereby enabling the non-speculative mode to begin fetching and decoding instructions following instructions contained in the recovery queue.

5. The method of claim 1, wherein after the recovery queue has been filled with a required number of instructions during speculative execution, subsequent instructions are not stored in the recovery queue.

6. The method of claim 5, wherein the required number of instructions stored in the recovery queue suffices to hide the latency of fetch and decode pipeline stages when execution of the non-speculative mode is restarted after the stall condition is resolved.

7. The method of claim 1, wherein the recovery queue is a FIFO structure.

8. The method of claim 7, wherein the FIFO structure is implemented as a RAM structure.

9. The method of claim 8, wherein the RAM structure includes a pointer indicating where the speculative mode should store a next instruction into the recovery queue and a pointer indicating where the non-speculative mode should read a next instruction from the recovery queue.

10. An apparatus for facilitating a fast restart after speculative execution, comprising:
    a processor;
    a pipeline in the processor;
    an execution mechanism within the processor;
    wherein the execution mechanism is configured to execute code in a non-speculative mode in the pipeline;
    wherein upon encountering a stall condition, the execution mechanism is configured to,
       checkpoint a state of the processor, and to
       execute the code in a speculative mode from a point of the stall in the pipeline, wherein, along with speculatively executing a predetermined number of the instructions initially encountered during execution in the speculative mode, the execution mechanism is configured to store all of the predetermined number of instructions, which are ready to be executed, regardless of the dependencies of the instructions to the recovery queue;
    wherein when the stall condition is resolved, the execution mechanism is configured to recommence execution in non-speculative mode in the pipeline, wherein the execution mechanism initially uses instructions from the recovery queue to load execution units, thereby allowing execution to proceed without waiting for instructions to propagate through fetch and decode pipeline stages; and
    wherein the execution mechanism is configured to subsequently execute instructions that follow instructions from the recovery queue in the pipeline, wherein the subsequently executed instructions have propagated through the fetch and decode stages of the pipeline after the non-speculative execution recommenced.

11. The apparatus of claim 10, wherein the execution mechanism is configured to buffer instructions in the recovery queue which are fully decoded, these instructions having been passed through pipeline fetch and decode stages.

12. The apparatus of claim 11, wherein when non-speculative more recommences, the recovery queue supplies fully decoded instructions to the execution unit until the execution unit is able to receive subsequent instructions that have propagated through the fetch and decode stages of the pipeline.

13. The apparatus of claim 11, wherein the recovery queue is configured to maintain a pointer to a physical address of an instruction following the last instruction stored in the recovery queue, thereby enabling the non-speculative mode to begin fetching and decoding instructions following instructions contained in the recovery queue.

14. The apparatus of claim 10, wherein the execution mechanism is configured to not store subsequent instructions in the recovery queue after the recovery queue has been filled with a required number of instructions during speculative execution.

15. The apparatus of claim 14, wherein the required number of instructions is at least equal to a number of instructions required to hide the latency of fetch and decode pipeline stages when execution of the non-speculative mode is restarted after the stall condition is resolved.

16. The apparatus of claim 10, wherein the execution mechanism is configured to have a recovery queue which is a FIFO structure.

17. The apparatus of claim 16, wherein the execution mechanism is configured such that the FIFO structure is implemented as a RAM structure.

18. The apparatus of claim 17, wherein the execution mechanism is configured such that the RAM structure includes a pointer indicating where the speculative mode should store a next instruction into the recovery queue and a pointer indicating where the non-speculative mode should read a next instruction from the recovery queue.

19. A computer system for facilitating a fast restart after speculative execution, comprising:
- a memory;
- a processor;
- a pipeline in the processor;
- an execution mechanism within the processor;
- wherein the execution mechanism is configured to execute code in a non-speculative mode in the pipeline;
- wherein upon encountering a stall condition, the execution mechanism is configured to,
  - checkpoint a state of the processor,
  - execute the code in a speculative mode from a point of the stall in the pipeline, wherein, along with speculatively executing a predetermined number of the instructions initially encountered during execution in the speculative mode, the execution mechanism is further configured to store all of the predetermined number of instructions which are ready to be executed, regardless of the dependencies of the instructions to the recovery queue;
- wherein when the stall condition is resolved, the execution mechanism is configured to recommence execution in non-speculative mode in the pipeline, wherein the execution mechanism commences execution initially using instructions from the recovery queue to load execution units for the non-speculative mode, thereby allowing the execution mechanism to proceed without waiting for instructions to propagate through fetch and decode pipeline stages; and
- wherein the execution mechanism is configured to subsequently execute instructions that follow instructions from the recovery queue in the pipeline, wherein the subsequently executed instructions propagated through the fetch and decode stages of the pipeline after the non-speculative execution recommenced.

20. The computer system of claim 19, wherein the execution mechanism is configured to buffer instructions to the recovery queue which are fully decoded, these instructions having been passed through pipeline fetch and decode stages.

* * * * *